(12) United States Patent
Potter et al.

(10) Patent No.: US 9,651,211 B2
(45) Date of Patent: May 16, 2017

(54) MULTI-FUNCTION OPTICAL SYSTEM WITH SHARED EXIT OPTIC

(71) Applicant: Valeo Lighting Systems North America, LLC, Seymour, IN (US)

(72) Inventors: Brant James Potter, Columbus, IN (US); Matthew James Berry, Seymour, IN (US); John Steven Orisich, Columbus, IN (US)

(73) Assignee: Valeo North America, Inc., Seymour, IN (US)

( * ) Notice: Subject to any disclaimer, the term of this patent is extended or adjusted under 35 U.S.C. 154(b) by 266 days.

(21) Appl. No.: 14/515,979

(22) Filed: Oct. 16, 2014

(65) Prior Publication Data

US 2016/0109084 A1    Apr. 21, 2016

(51) Int. Cl.
*F21V 9/00*      (2015.01)
*F21S 8/10*      (2006.01)
*F21V 8/00*      (2006.01)
*F21Y 101/00*    (2016.01)

(52) U.S. Cl.
CPC ......... *F21S 48/1241* (2013.01); *F21S 48/115* (2013.01); *F21S 48/1266* (2013.01); *F21S 48/1747* (2013.01); *F21S 48/215* (2013.01); *F21S 48/225* (2013.01); *F21S 48/2225* (2013.01); *F21S 48/2243* (2013.01); *G02B 6/0078* (2013.01); *F21S 48/1329* (2013.01); *F21Y 2101/00* (2013.01)

(58) Field of Classification Search
CPC .. F21S 48/1241; F21S 48/1266; F21S 48/115; F21S 48/2225; F21S 48/1747; F21S 48/215; F21S 48/2243; F21S 48/225; F21S 48/1329; G02B 6/0078; F21Y 2101/00

USPC ....... 362/511, 603, 616, 516, 517, 543, 544, 362/545

See application file for complete search history.

(56) References Cited

U.S. PATENT DOCUMENTS

| | | |
|---|---|---|
| 4,868,718 A | 9/1989 | Davenport et al. |
| 6,520,669 B1 | 2/2003 | Chen et al. |
| 6,926,432 B2 | 8/2005 | Rodriguez Barros et al. |
| 6,945,672 B2 | 9/2005 | Du et al. |
| 6,953,274 B2 | 10/2005 | Rice |
| 7,011,438 B2 | 3/2006 | Schuster et al. |

(Continued)

FOREIGN PATENT DOCUMENTS

| | | |
|---|---|---|
| DE | 10315131 | 10/2004 |
| DE | 102004036157 | 2/2006 |

(Continued)

OTHER PUBLICATIONS

Machine English Translation of FR3026865A1, Published Mar. 2016, France, Author: Meyrenaud.*

*Primary Examiner* — Anh Mai
*Assistant Examiner* — Glenn Zimmerman
(74) *Attorney, Agent, or Firm* — Jacox, Meckstroth & Jenkins

(57) ABSTRACT

A light for a vehicle. Two or more light guides each project a sheet of light to a common projection lens, but in different directions. Each light guide is selectively actuable by the driver. The projection lens receives the sheets of light, expands them in the horizontal direction, and projects them in the same general direction as received. Thus, the driver can selectively illuminate various regions of the terrain.

34 Claims, 23 Drawing Sheets

(56) References Cited

U.S. PATENT DOCUMENTS

| | | | |
|---|---|---|---|
| 7,070,310 B2 | 7/2006 | Pond et al. | |
| 7,131,758 B2 | 11/2006 | Ishida | |
| 7,156,544 B2 | 1/2007 | Ishida | |
| 7,183,851 B2 | 2/2007 | Song | |
| 7,207,703 B2 | 4/2007 | Iwasaki | |
| 7,258,474 B2 | 8/2007 | Valcamp et al. | |
| 7,513,642 B2 | 4/2009 | Sormani | |
| 7,731,402 B2 | 6/2010 | Tessnow et al. | |
| 2004/0042212 A1 | 3/2004 | Du et al. | |
| 2004/0085779 A1 | 5/2004 | Pond et al. | |
| 2005/0068787 A1 | 3/2005 | Ishida | |
| 2006/0193145 A1 | 8/2006 | Eichhorn et al. | |
| 2006/0203486 A1* | 9/2006 | Lee | G02B 6/0018 362/244 |
| 2006/0221310 A1* | 10/2006 | Kim | F21K 9/00 353/99 |
| 2008/0013333 A1* | 1/2008 | Koizumi | B60Q 1/2696 362/511 |
| 2009/0001490 A1 | 1/2009 | Bogner et al. | |
| 2009/0034278 A1 | 2/2009 | Tessnow et al. | |
| 2009/0073710 A1 | 3/2009 | Sormani et al. | |
| 2010/0202153 A1* | 8/2010 | Schwab | B60Q 1/0041 362/520 |
| 2014/0321139 A1* | 10/2014 | Bungenstock | F21S 48/00 362/511 |
| 2016/0076721 A1* | 3/2016 | Meyrenaud | F21S 48/1154 362/522 |

FOREIGN PATENT DOCUMENTS

| | | | |
|---|---|---|---|
| EP | 1388461 | 2/2004 | |
| FR | 3025865 A1 * | 3/2016 | F21S 48/1154 |
| WO | 2006096467 | 9/2006 | |

* cited by examiner

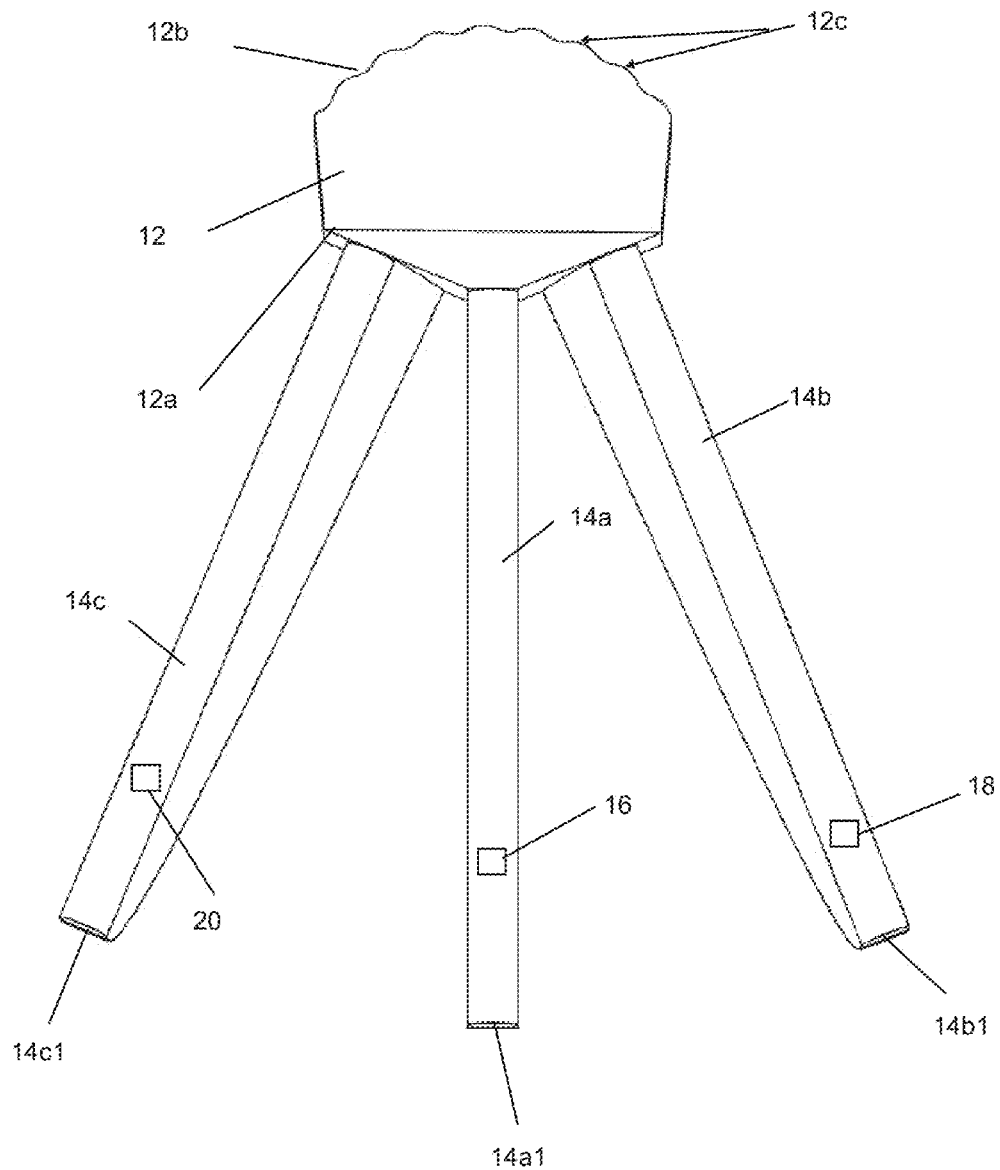

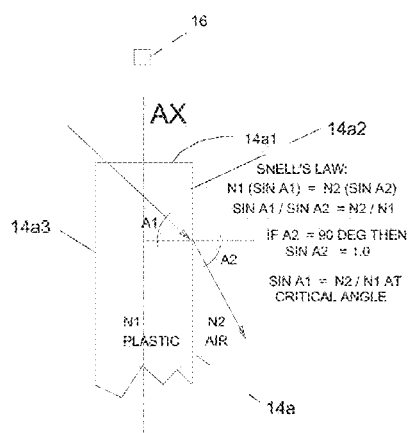
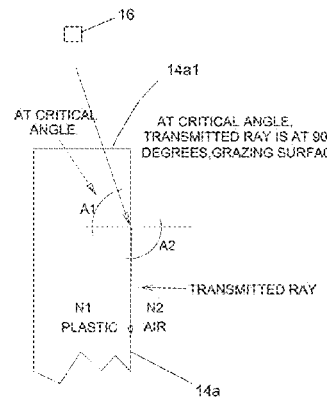
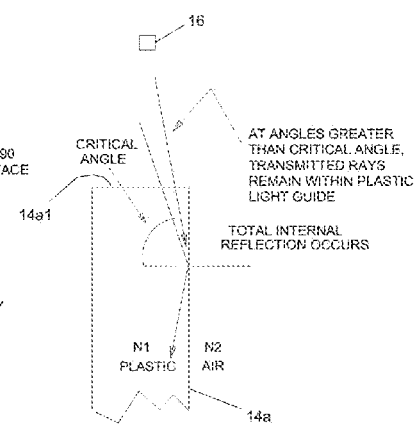
FIG 7
FIG 8
FIG 9

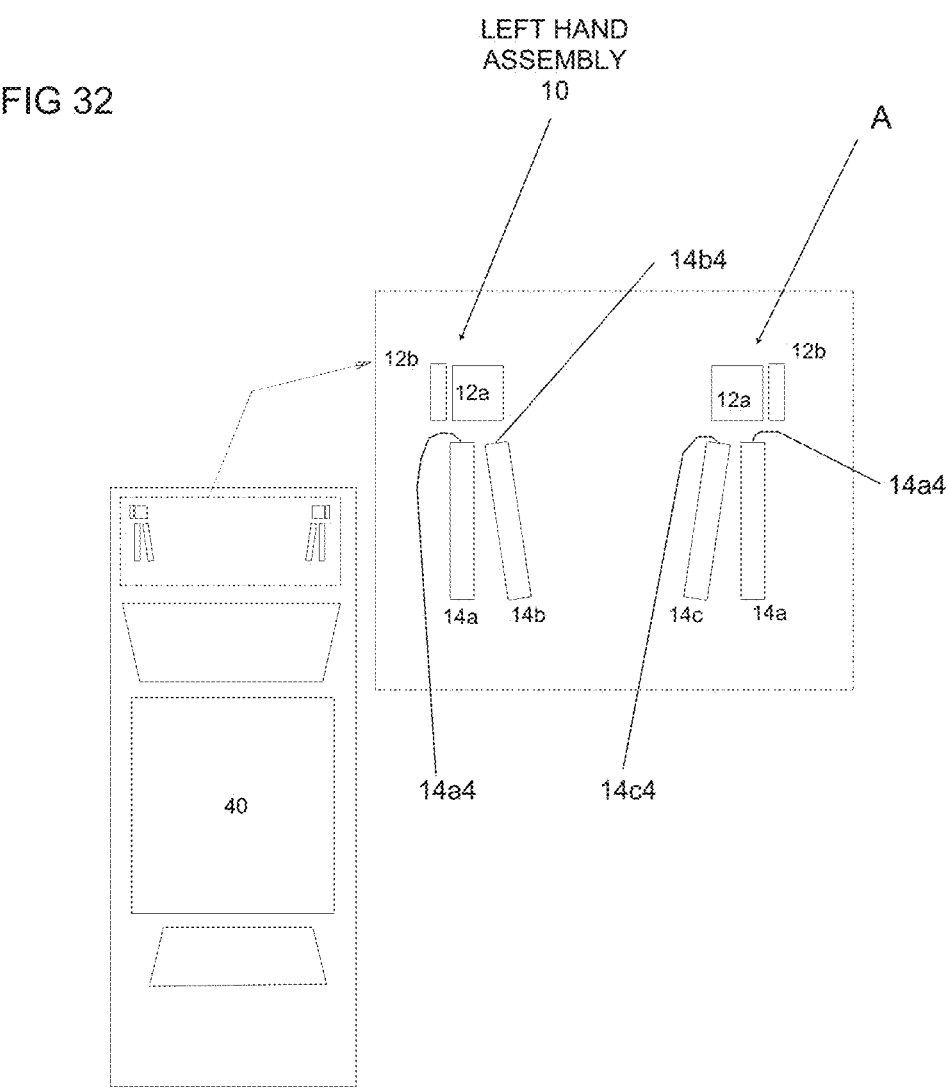

MULTI-FUNCTION OPTICAL SYSTEM WITH SHARED EXIT OPTIC

BACKGROUND OF THE INVENTION

1. Field of the Invention

This invention relates to a multi-function optical system for forward lighting that utilizes a shared exit optic. The system is high efficiency and maintains a consistent lit appearance between functions and smooth on-road transition between functions.

2. Description of the Related Art

Lighting systems of the past included bending light/cornering light or turn signal functions as a separate optical systems from low beam, high beam and/or fog. These separate functions were separated into different optical systems.

One prior art lighting or signaling devices is known from the patent application WO 2006/096467, which is related to U.S. Provisional Application 60/658,459, and which is incorporated herein by reference. This document discloses a lighting device that comprises a ray guide in the form of solid pieces that are tricky and expensive to produce. Performance in terms of range is reduced because of only moderately satisfactory collimation. In addition, the dimensions of the whole are relatively large.

In general, many light guide technologies for signal functions have poor efficiency and often require a large number of LEDs and/or light guides or fixtures to produce a desired lit area. In addition, these prior art technologies are either single function or have multi-functions, but the lit aspect for different colors is different.

Current high-efficiency light guides are intended for forward lighting applications and typically have a single source and a single lit aspect.

What is needed, therefore, is multi-function optical system for forward lighting that utilizes a shared exit optic having improved efficiency and that is capable of a consistent lit appearance between functions and smooth on-road transition between functions.

SUMMARY OF THE INVENTION

In one embodiment, the system uses multiple high efficiency light guides coupling into a single lens to create on-axis forward lighting (such as low beam, high beam, fog light) and off-axis forward lighting (such as bending light or cornering light) out of a single exit optic. The guides and the exit optic may be made as one piece or as multiple pieces and separated by an air gap.

An on-axis forward lighting (such as low beam, high beam, fog light) and off-axis forward lighting (such as bending light or cornering light) out of a single exit optic, while maintaining consistent lit appearance and blending beam patterns of different functions to create smooth on-road light (no streaks). One object is to incorporate additional functionality into a low beam system without increasing number of modules (or exit optic elements) in the system. One potential solution was to create a system at a modular level that could perform multiple functions while retaining identical number of exit optics.

In one aspect, one embodiment comprises a lighting device for a vehicle, comprising a first light guide that projects emits first light rays from a first light source in a first direction, at least one second light guide that projects second light rays from a second light source in a second direction, an elongated projection lens which receives said first light rays and emits them to perform a first light function, and receives said second light rays and emits them to perform a second light function.

In another aspect, one embodiment comprises an optical device for a vehicle, comprising a first light guide which receives light from a first light source and forms the light into a first beam that performs a first lighting function forward of the vehicle, at least one second light guide which receives light from a second light source and forms the light into a second beam that performs a second lighting function, a lens which i) receives the first beam and transmits the first beam in a first direction forward of the vehicle, and ii) receives the second beam and transmits the second beam in a second direction at an angle that is not parallel to a longitudinal axis of the vehicle.

In still another aspect, one embodiment comprises a lighting system for a vehicle, comprising a) a first solid, transparent body, which comprises i) a first lens, ii) a first light guide, which transmits a first beam of light to the first lens, which the first lens projects forward of the vehicle, and iii) a second light guide, which transmits a second beam of light to the first lens, which the first lens projects to the left front side of the vehicle, b) a second solid, transparent body, which comprises i) a second lens, ii) a third light guide, which transmits a third beam of light to the second lens, which the second lens projects forward of the vehicle, and iii) a fourth light guide, which transmits a fourth beam of light to the second lens, which the second lens projects to the right front side of the vehicle.

This invention, including all embodiments shown and described herein, could be used alone or together and/or in combination with one or more of the features covered by one or more of the following list of features:

The lighting device in which the projection lens, the first light guide, and the at least one second light guide are an integral, monolithic construction of transparent material.

The lighting device in which the first light guide and the at least one second light guide are angularly spaced with a predetermined angle between each adjacent pair of the first light guide and the at least one second light guide.

The lighting device in which all adjacent ones of the first light guide and the at least one second light guide are angularly spaced along an arc an equal distance apart.

The lighting device in which all adjacent ones of the first light guide and the at least one second light guide are angularly spaced along an arc different distances apart.

The lighting device in which the first light guide and the at least one second light guide are parabolic and generally planar light guides.

The lighting device in which the first light function is a forward lighting function defining at least one of a low beam headlight or a part of a low beam headlight, a high beam headlight or a fog light for the vehicle.

The lighting device in which the second light function is a side lighting function defining at least one of a turn signal light or a side light low beam headlight, a high beam headlight or a fog light for the vehicle.

The lighting device in which the second light function is a side lighting function defining at least one of a turn signal light, bending light or a side light for the vehicle.

The lighting device in which the first light guide contains a central plane which bisects the projection lens.

The lighting device in which the first light guide and the at least one second light guide each comprise an exit face that is spaced from an entry face of the elongated projection lens.

The lighting device in which the first light source comprises at least one first LED and the second light source comprises at least one second LED, wherein when the at least one first LED is activated, the first lighting function is performed and when the at least one second LED is activated the second lighting function is performed.

The lighting device in which the at least one first LED and the at least one second LED are activated substantially simultaneously to perform the first and second lighting functions substantially simultaneously.

The optical device in which the at least one of the first light guide or the at least one second light guide comprises a reflective edge which is of generally parabolic shape and positioned so that its focus generally coincides with the first light source, wherein the reflective edge receives light from the first light source, forms it into the first beam, and projects the first beam to the projection lens.

The optical device in which the first light guide comprises a first exit edge spaced from the lens and a first generally parabolic reflective edge having a first focus that generally coincides with the first light source and the second light guide comprises a second exit edge spaced from the lens and a second generally parabolic reflective edge having a second focus that generally coincides with the second light source, wherein the first and second reflective edges of the first and second light guides receive light from the first light source and second light sources, respectively, and emit the first beam through the first exit edge to the lens and emits the second beam through the second exit edge to the lens.

The optical device in which the first beam crosses the second beam inside the lens.

The optical device in which the lens, the first light guide, and the at least one second light guide are an integral, monolithic construction of transparent material.

The optical device in which the first and second light guides are cantilevered from the lens and further comprise a connector which connects the cantilevered light guides together, to thereby stiffen them.

The optical device in which the first beam is wider than the second beam and is effective to form a headlight for a vehicle.

The optical device in which the first light guide and the at least one second light guide are angularly spaced with a predetermined angle between each adjacent pair of the first light guide and the at least one second light guide.

The optical device in which all adjacent ones of the first light guide and the at least one second light guide are angularly spaced along an arc an equal distance apart.

The optical device in which at least one adjacent ones of the first light guide and the at least one second light guide are angularly spaced along an arc different distances apart.

The optical device in which the first light function is a forward lighting function defining at least one of a low beam headlight, a high beam headlight or a fog light for the vehicle.

The optical device in which the second light function is a side lighting function defining at least one of a turn signal light or a side light low beam headlight, a high beam headlight or a fog light for the vehicle.

The optical device in which the first light source comprises at least one first LED and the second light source comprises at least one second LED, wherein when the at least one first LED is activated, the first lighting function is performed and when the at least one second LED is activated the second lighting function is performed, the at least one first LED and the at least one second LED being activated substantially simultaneously.

The optical device in which the at least one first LED and the at least one second LED are activated substantially simultaneously to perform the first and second lighting functions substantially simultaneously.

The optical device as recited in claim 14 wherein the at least one second light guide comprises a second light guide situated adjacent the first light guide and a third light guide situated adjacent the first light guide, the second and third light guides being adapted to perfume the second lighting function, while the first light guide performs the first lighting function, the first lighting function being a forward headlight function.

The lighting system in which the first and second bodies are mirror images of each other.

The lighting system and further comprising a light source for each respective light guide.

The lighting system in which each light guide comprises a curved edge (1) to which the respective light source transmits light, and (2) which reflects the light as a beam of parallel rays.

The lighting system further comprising a plurality of light sources for at least one of said light guides.

The lighting system further comprising a plurality of light sources for each light guide.

These and other objects and advantages of the invention will be apparent from the following description, the accompanying drawings and the appended claims.

BRIEF DESCRIPTION OF THE ACCOMPANYING DRAWINGS

FIGS. 1A-1E are views of one form of the invention;

Figure 17:
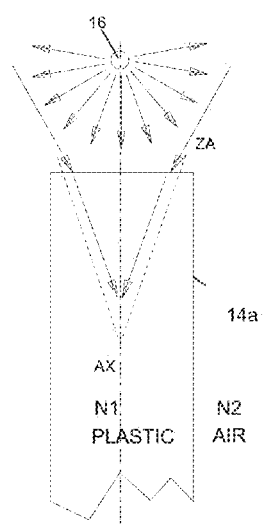
Figure 18:
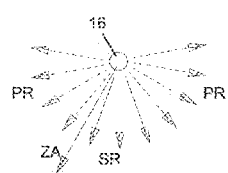
Figure 19:
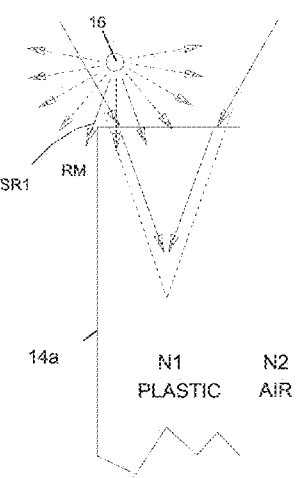
Figure 20:
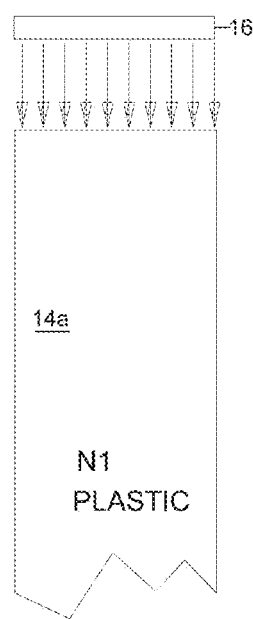
Figure 21:
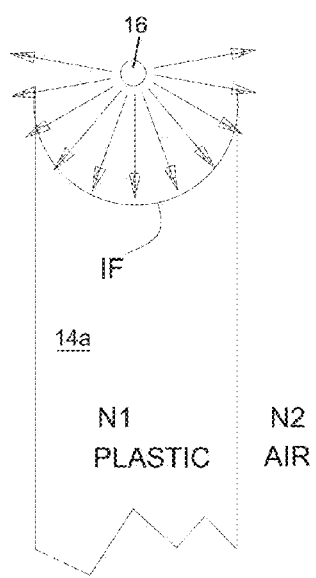
Figure 22:
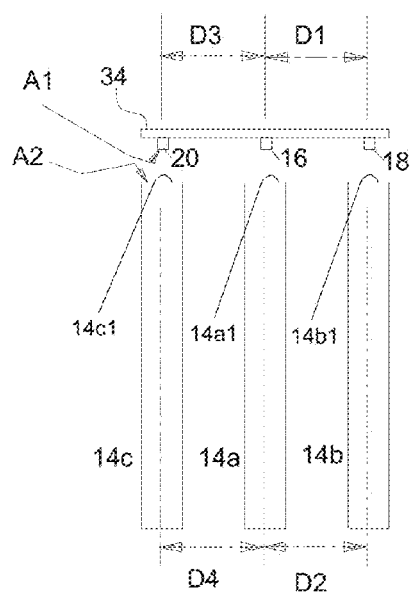
Figure 23:
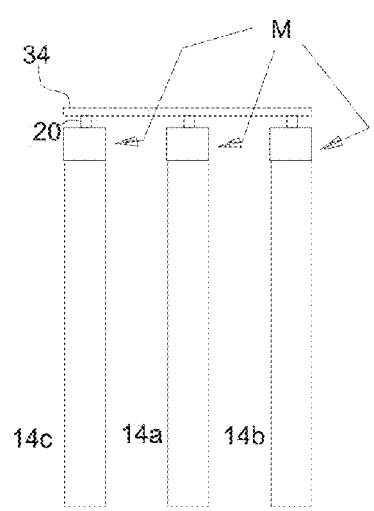
Figure 24:
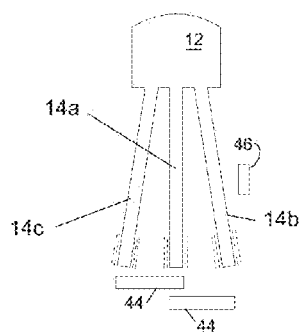
Figure 31:
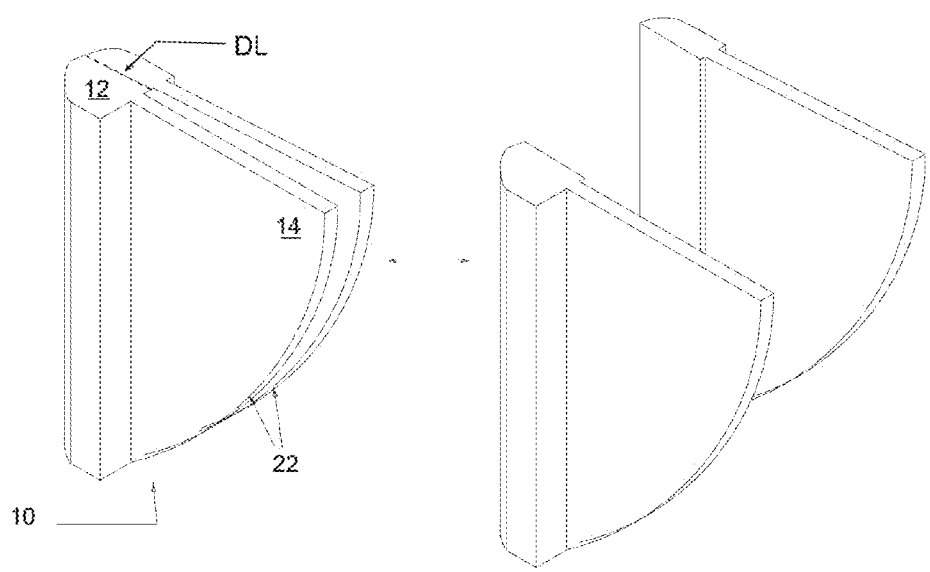

FIGS. 7, 8, and 9 explain the term critical angle;

FIGS. 10, 11, 12, 13, 14, 15, and 16 explain the term zone of acceptance;

FIGS. 17, 18, and 19 illustrate why the LED 16, 18 and 20 of FIGS. 1A-1D should be located generally centrally within light guide 14;

FIGS. 20 and 21 illustrate two types of entry of light into the light guide 14 from the LED 16, 18 and 20;

FIG. 22 defines separation distances between adjacent LEDs 16, 18 and 20 and between adjacent light guides 14a-14c;

FIG. 23 shows an optical coupling medium M;

FIG. 24 illustrates an approach to reducing vibration in the invention;

FIGS. 25-30 illustrate an alternate approach to constructing one form of the invention;

FIG. 31 illustrates another form of the invention; and

FIG. 32 illustrates a top-down view of a vehicle 40 and illustrates one form of the invention mounted thereon.

DETAILED DESCRIPTION OF THE PREFERRED EMBODIMENTS

Figure 1A:
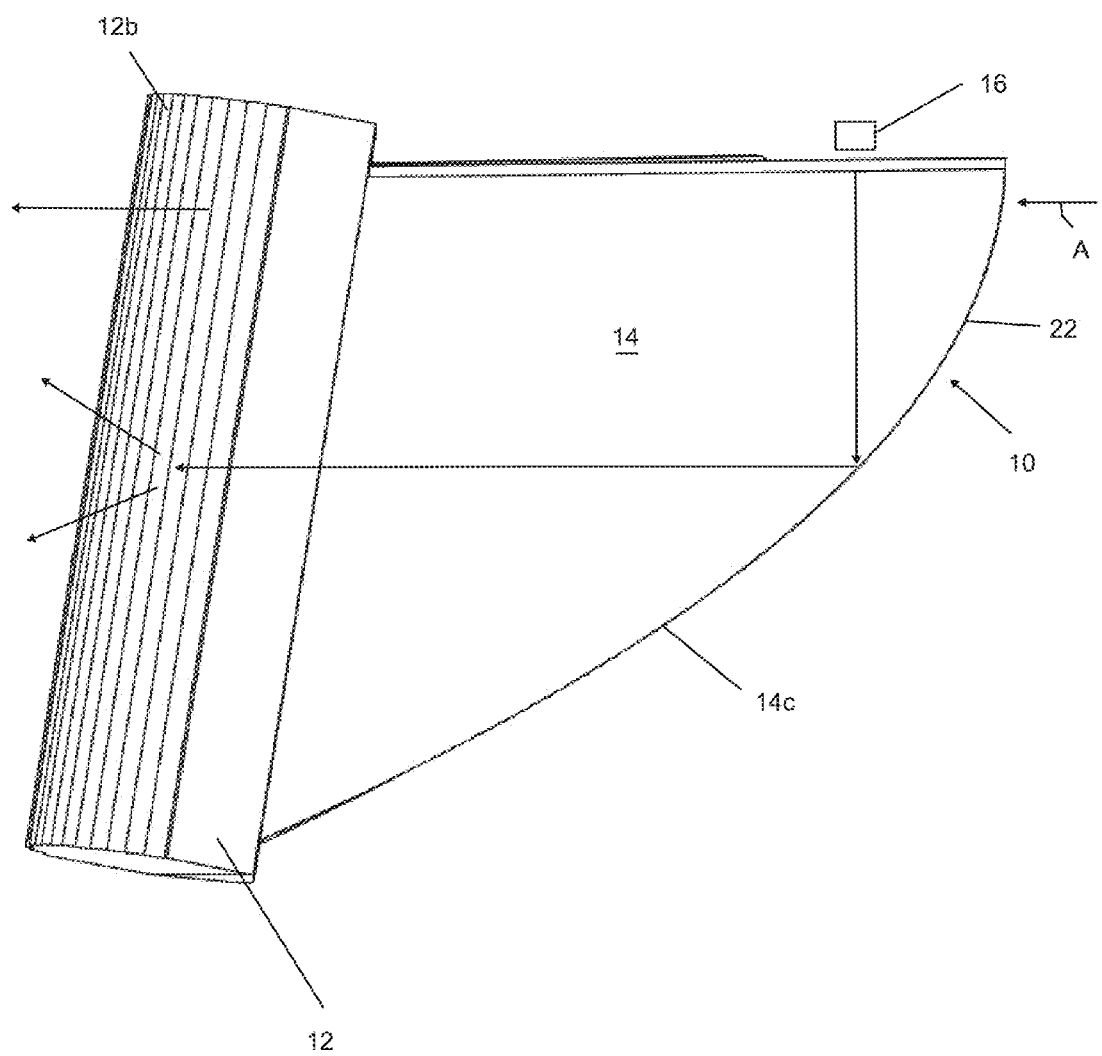
Figure 1C:
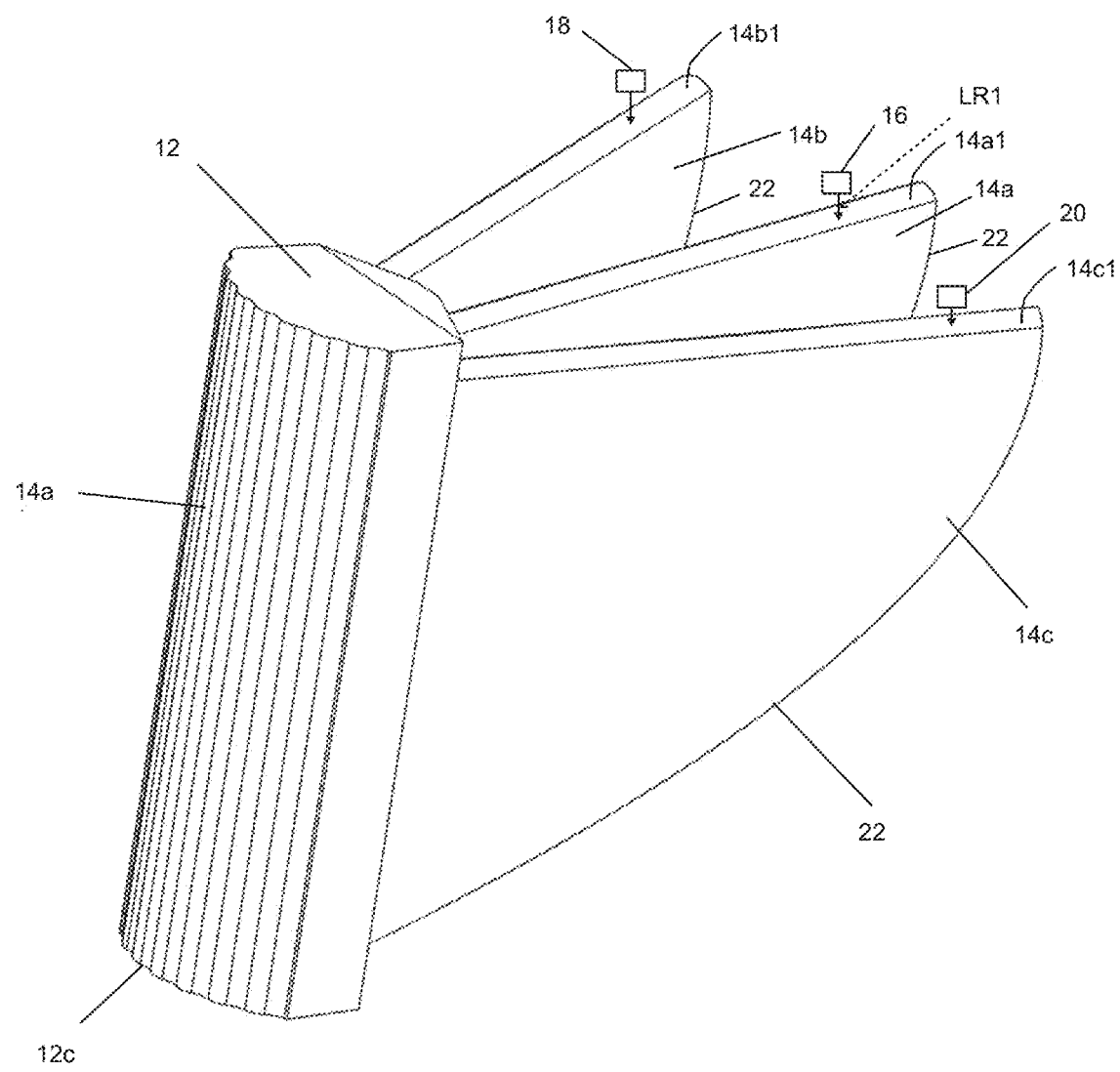
Figure 1D:
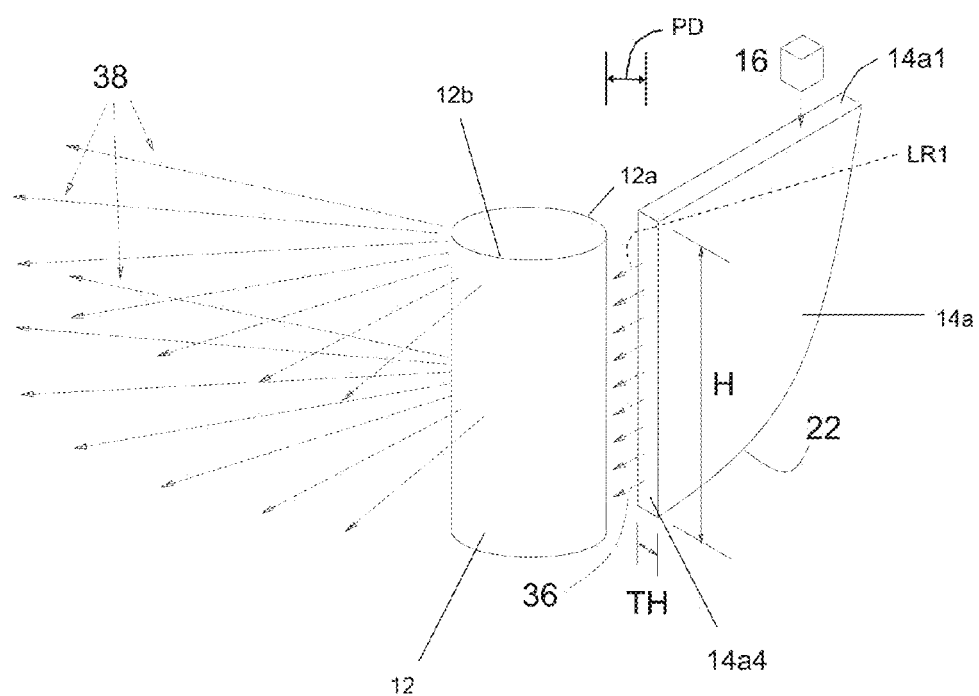

FIGS. 1A-1E and FIGS. 2A-2E illustrate several forms of the invention for use in an optical device, such as a headlamp or turn signal device, for a vehicle. An assembly 10 contains a generally cylindrical lens 12 and a plurality of light guides 14a, 14b and 14c. In the illustration being described, the assembly 10 is constructed of a transparent material. The assembly 10 can be molded as a single unit in a single molding step as shown in FIGS. 1A-1C or the plurality of light guides 14a, 14b and 14c may be separated from the lens 12 by a predetermined distance PD, as illustrated in FIGS. 1D and 2A-2E. In one embodiment, the predetermined distance PD is on the order of about 0.5 mm.

Figure 1E:
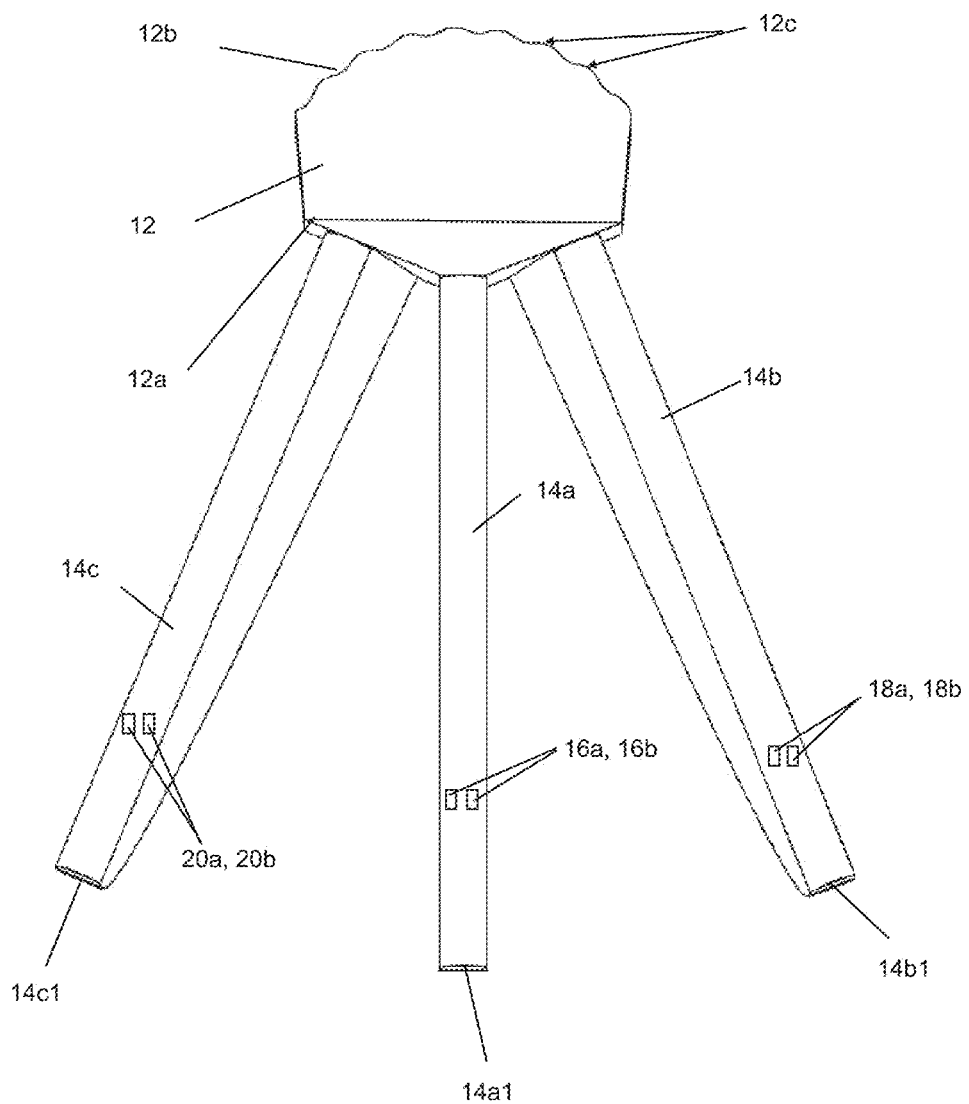
Figure 2A:
FIGS. 2A-2E are cross-sectional views of one form of the invention, viewed from above, and show various light paths.
Figure 2B:
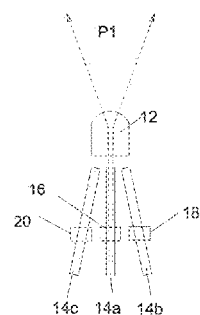

FIGS. 2A-2E show a simplified overview of an operation of one form of the invention. In the illustration shown in FIGS. 2A-2E, an optional air space S between ends or exit faces 14a1, 14a2 and 14a3 and lens entry face 12a of the lens 12 is shown. Each light guide 14a-14c, when activated, projects light rays LR1, LR2 and LR3, respectively, from at least one light-emitting diode (LED) 16, 18, 20 (as best shown in FIG. 1C) through the common projection lens 12. However, the overall pattern of illumination depends on the combination of LEDs 16-20 and their respective light guides 14a-14c which are activated by a controller and conventional power source (which is only shown schematically in FIG. 2A for ease of description). The controller may be provided on the printed circuit board (PCB) with the LEDs 16-20, or provided in the headlamp assembly 10 or elsewhere on the vehicle. For example, in FIG. 2B, only the light guide 14a and LED 16 are activated to generate a forward or first lighting function, such as the central pattern P1, as illustrated in FIG. 2B and shown in FIG. 6A. In one embodiment, this pattern P1 can be used as a high-beam or a low-beam headlight in a vehicle. The light guides 14a or 14c and their associated LEDs 18 and 20, respectively, are adapted to provide or generate a second lighting function such as a turn signal, DBL or side lighting function. It should be understood that multiple LEDs or an array of LEDs may be provided to one or more of the light guides 14a-14c if desired. Also, the LEDs could perform the same or different lighting functions. FIG. 1E illustrates the use of multiple LEDs 16a, 16b, 18a, 18b, 20a and 20b that could be used with the light guides 14a-14c.

Figure 2C:
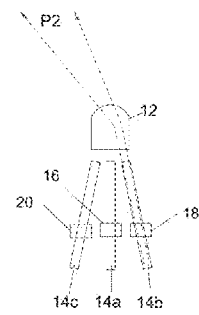
Figure 2D:
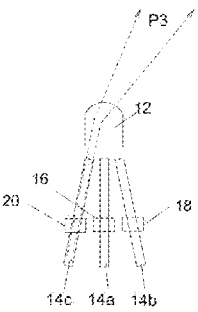
Figure 6A:
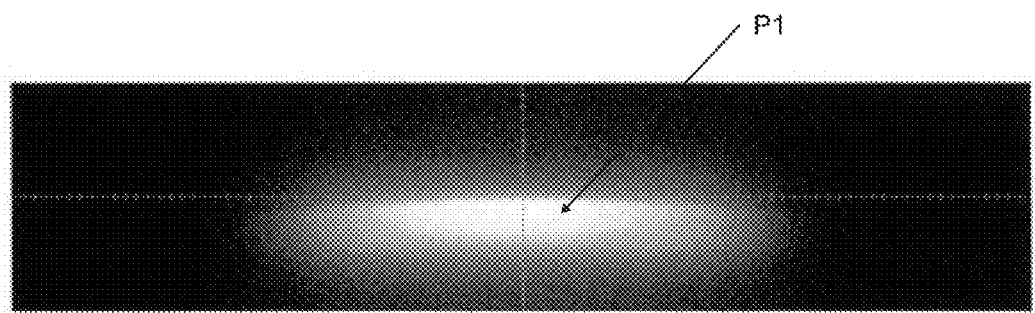
FIGS. 6A-6F are simulations which illustrate various patterns of light projected by one form of the invention.
Figure 6B:
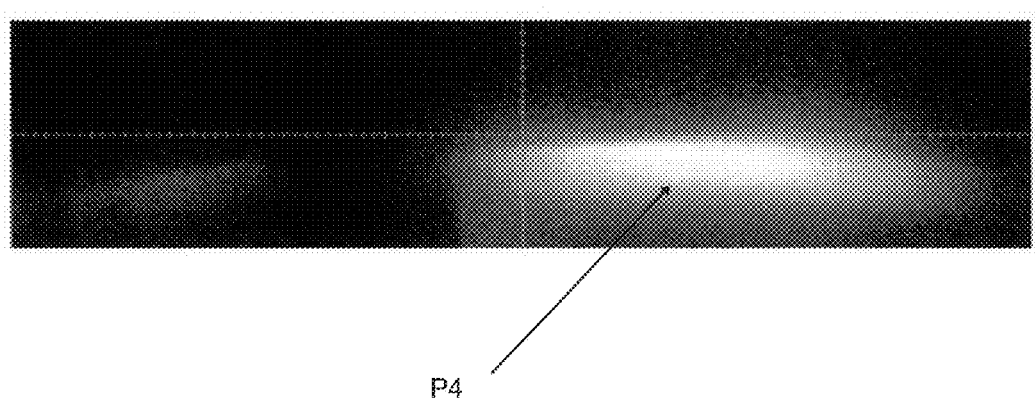
Figure 6C:
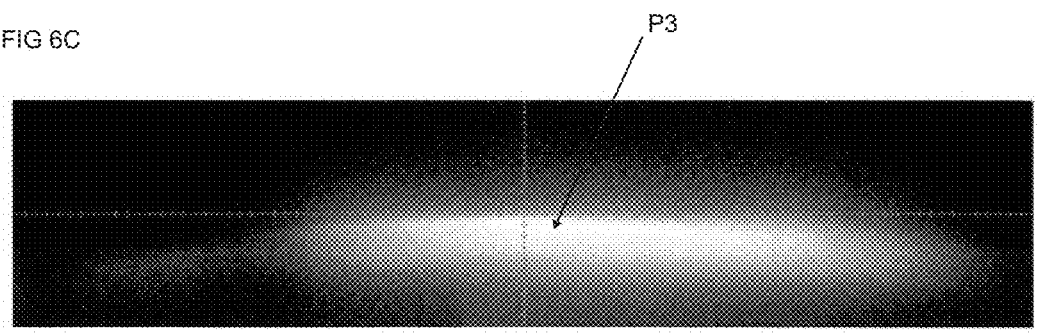

In FIG. 2C, light guide 14b and LED 18 alone are activated to pass light rays LR2 and produce pattern P2 (illustrated on the left side of FIG. 6C). This pattern P2 can be used, for example, to illuminate the left front side of the vehicle or provide a turn signal when making a left turn. In FIG. 2D, light guide 14c and LED 20 alone are activated and produce pattern P3 on the right side. This pattern P3 can be used to illuminate the right front side of the vehicle or provide a turn signal when making a right turn.

Thus, the patterns P2 and P3 can be used as turn signal indicators. As another alternate, the patterns P2 and P3 can be used as fog lights or used in a dynamic bending lamp or side lighting function.

The following Table I summarizes some of the functions:

TABLE I

| CASE | Function | | | LEDs Activated |
|---|---|---|---|---|
| | Middle A 14A | Right B 14B | Left C 14C | |
| 1 | Low Beam (Flat) | Low Beam (Flat) | Low Beam (Flat) | All LEDs on together for Low Beam. Each contributes to different part of Low Beam |
| 2 | Bending (Side) | Bending (Side) | Bending (Side) | LEDs sequenced (based on turning angle or other inputs) |
| 3 | Low Beam (Flat) | Auxiliary High Beam | Auxiliary High Beam | High Beam to supplement another High Beam. |
| 4 | High Beam | Low Beam (Flat) | Low Beam (Flat) | |
| 5 | Fog | Auxiliary High Beam | Auxiliary High Beam | High Beam to supplement another High Beam. |
| 6 | Fog | Bending (Side) | Bending (Side) | |
| 7 | DRL | Low Beam (Flat) | Low Beam (Flat) | |
| 8 | DRL | Bending (Side) | Bending (Side) | |
| 9 | DRL/Turn | Low Beam (Flat) | Low Beam (Flat) | 2 LEDs (white, amber) in 14a middle guide |
| 10 | DRL/Turn | Auxiliary High Beam | Auxiliary High Beam | 2 LEDs (white, amber) in 14a middle guide |
| 11 | Stop/Turn | Backup | Backup | 2 LEDs (red, amber) in 14a guide |

Functions can be interchanged between guide locations (14a, 14b, 14c)
Each Blade can make following patterns: High Beam; Low Beam Flat; Fog and Signal (Stop, Turn, Tail)

Figure 2E:
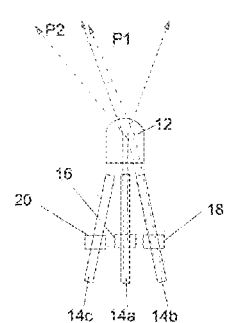

Separate illumination of each light guide 14a-14c has been described. It should be understood that multiple light guides 14a-14c can be selectively activated individually or one or more can be activated simultaneously. For example, as in FIG. 2E, LED 16 and light guide 14a can produce pattern P1 (a headlight beam) while LED 18 and light guide 14b can simultaneously produce pattern P2 for illuminating the left front side of the vehicle during a left turn or to provide a dynamic bending light during a turn. One benefit or advantage of this arrangement is that the overall pattern in FIG. 2E is aesthetically pleasing because the light intensity is rather uniformly distributed across the combined patterns P1 and P2 without significant gaps or streaks on the roadway which is illuminated.

Figure 3A:
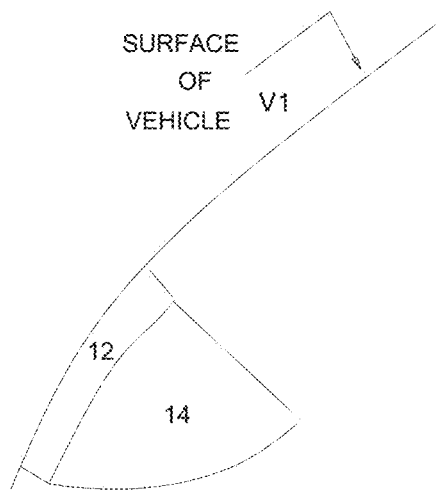
FIGS. 3A and 3B show how the invention can be incorporated into the surface of a vehicle.
Figure 3B:
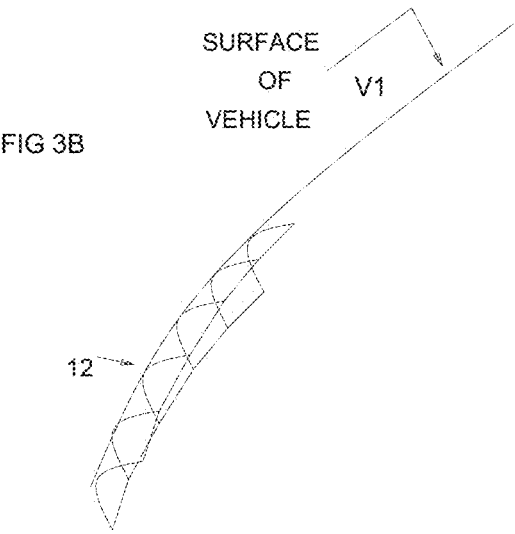

Also, an external surface 12b of the lens 12 of FIGS. 1A-1C and 2A-2E can be adapted to be made conformal with an external surface V1 (FIGS. 3A and 3B) of the vehicle V, as shown in the left side of FIG. 3B, for styling purposes and to meet aerodynamic requirements. No secondary protective lens is required. In addition, the lens 12 is highly adaptable because it can be curved in multiple dimensions, as indicated by the wire frame sketch in FIGS. 3A-3B.

Figure 4:
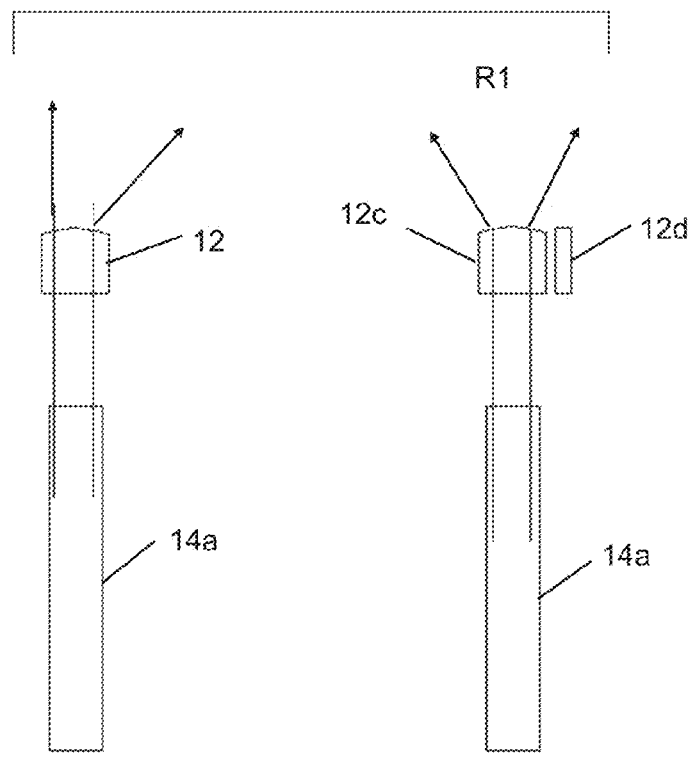
FIGS. 4 and 5 are high-level schematics which explain processing of light which the invention accomplishes.
Figure 5:
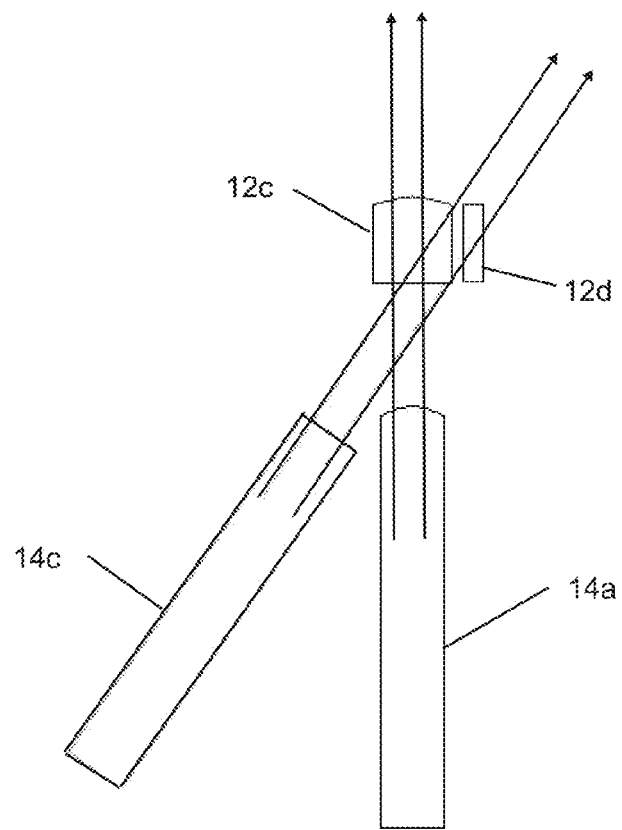

This discussion will return to the structure of the assembly 10 of FIGS. 1A-1D and FIGS. 2A-2E. Each light guide 14a-14c contains a reflective surface 22 which may bear a reflective coating, such as an aluminum film. The reflective surface 22 is of the parabolic type. The lens 12, while a single, integral and monolithic unit in one form of the invention, can be conceptually divided into multiple functional sections, two of which lens sections 12c and 12d, are schematically shown in FIG. 4. The light guide 14a transmits most of the light from LED 16 (not shown in the figure for ease of illustration) to the lens section 12c, which focuses or spreads the rays LR1 according to the shape of lens section 12c. In FIG. 5, the light guide 14c, for example, transmits its rays LR3 to both the lens sections 12c and 12d. The particular allocation of the light between lens sections 12c and 12d for this light guide 14c will depend on the design of the system. Alternately, in one form of the invention, a majority of the light from light guide 14c travels through the lens section 12d.

As mentioned earlier, FIGS. 6A through 6F illustrate simulations illustrating operation of the apparatus of FIGS. 1A-1C and 2A-2E. In FIG. 6A, only the light guide 14a and LED 16 are illuminated to provide the pattern P1, and in FIG. 6B, only the light guide 14c and LED 20 are illuminated to provide the pattern P4 to provide a bending light to the right.

Figure 6D:
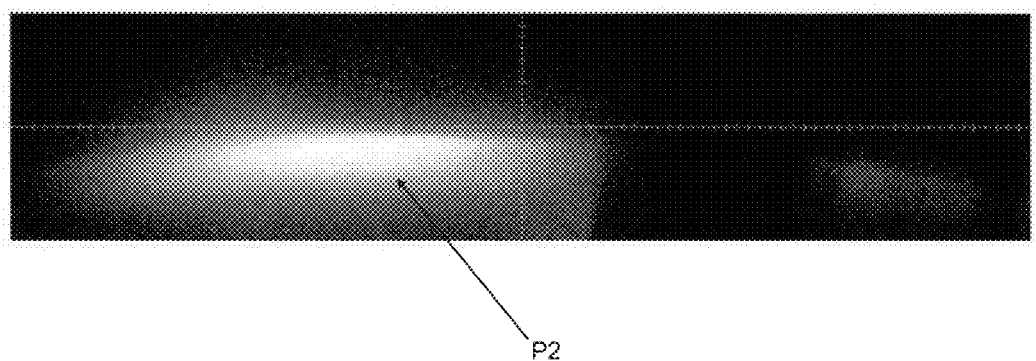

In FIG. 6C, light guides 14a and 14c and LEDs 16 and 20, respectively, are illuminated to provide the pattern P3 to bend light to the left. In FIG. 6D, the light guide 14b and LED 18 are illuminated to provide the pattern P2.

Figure 6E:
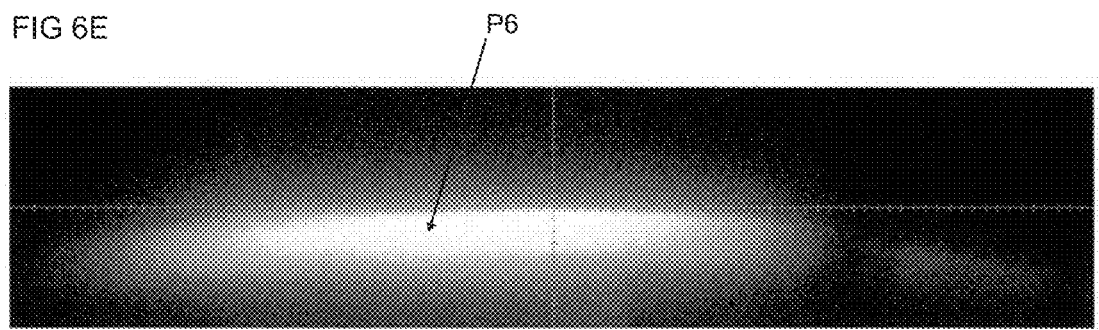

In FIG. 6E, the light guides 14a and 14b of FIGS. 6A and 6B are illuminated together by LEDs 16 and 18, respectively, to provide a pattern P2 that provides a bending light to the left. It is pointed out that the light rays LR2 of light guide 14b cross the light rays LR1 of light guide 14a within the lens 12. The result is that the projected beams or light rays LR1 and LR2 overlap as illustrated in FIG. 2E and indicated in FIG. 6E to provide the pattern P2.

Figure 6F:
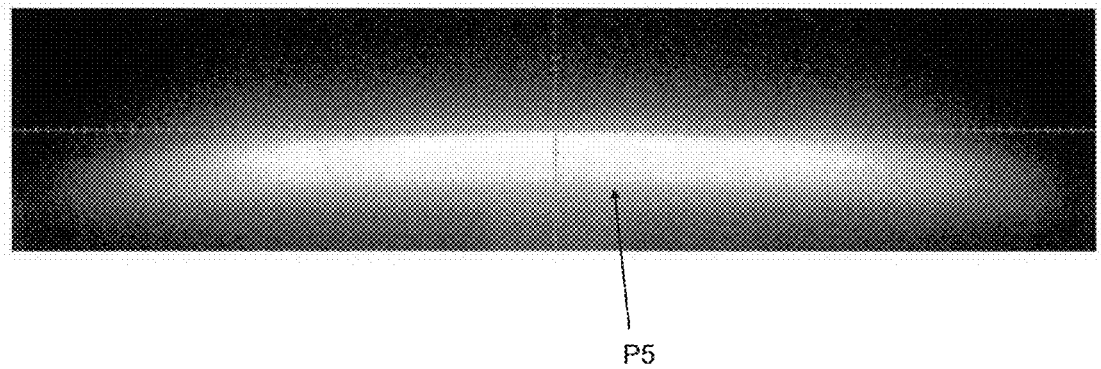

In FIG. 6F, all three light guides 14a, 14b, and 14c and their associated LEDs 16, 18 and 20, respectively, are illuminated and indicates the uniformity of illumination and a pattern P5 which is obtained. A plurality of scallops 12c in the exit face 12b of the lens 12 in FIG. 1A promote this uniformity by introducing an amount of scattering into the projected beams or rays LR1, LR2 and LR3.

In one form of the invention, light sources or LEDs 16, 18 and 20 are mounted on a single printed-circuit board 34 (FIGS. 22 and 23). These LEDs 16, 18 and 20 are properly aligned with entry surfaces 14a1 (FIG. 22), 14a2 and 14a3 of light guides 14a, 14b and 14c, respectively, so that during assembly, all light sources or LEDs 16, 18 and 20 can be installed by a single process of installing a single circuit board. This alignment process will be explained in more detail later herein.

Figure 6G:
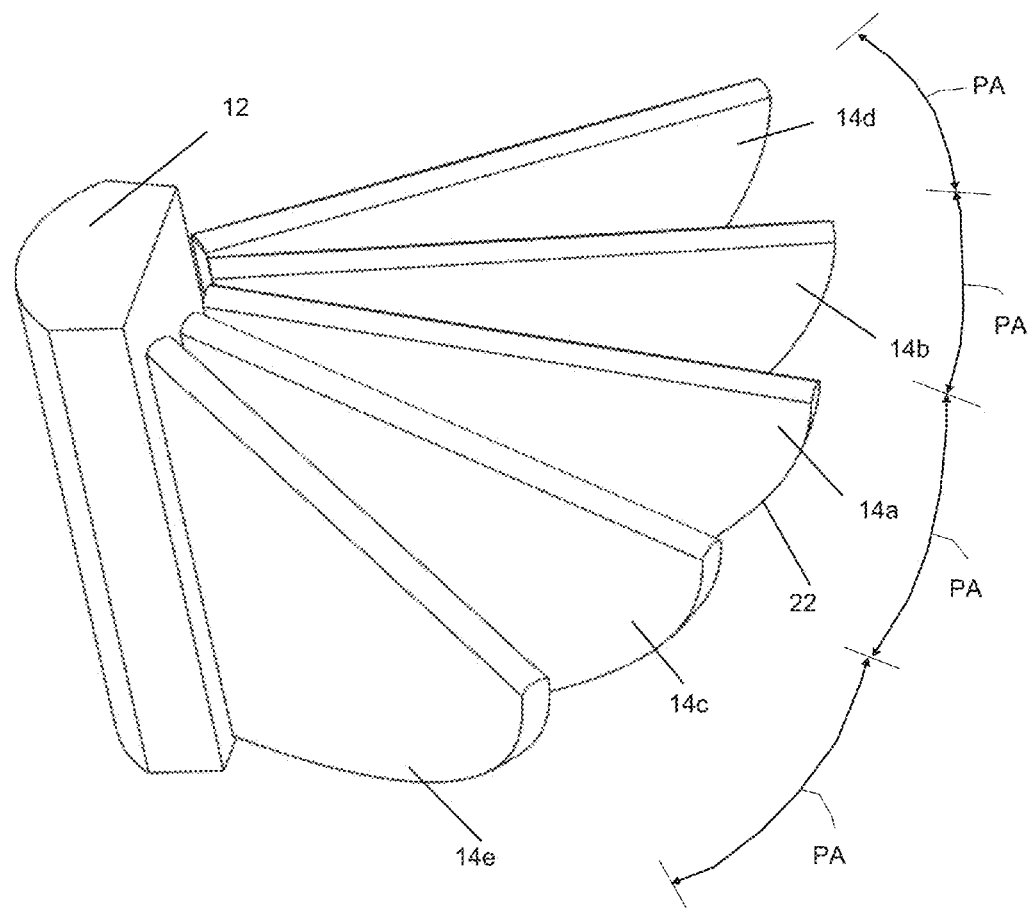
FIG. 6G-6I illustrates other forms of the invention.
Figure 6H:
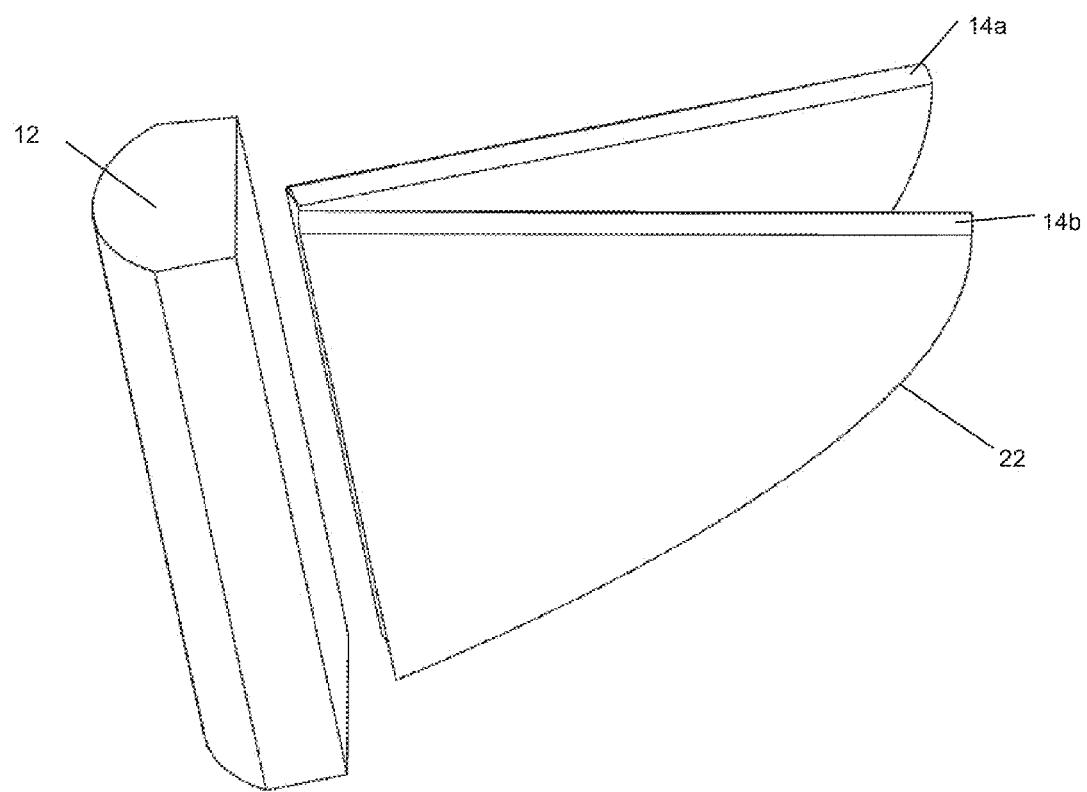
Figure 6I:
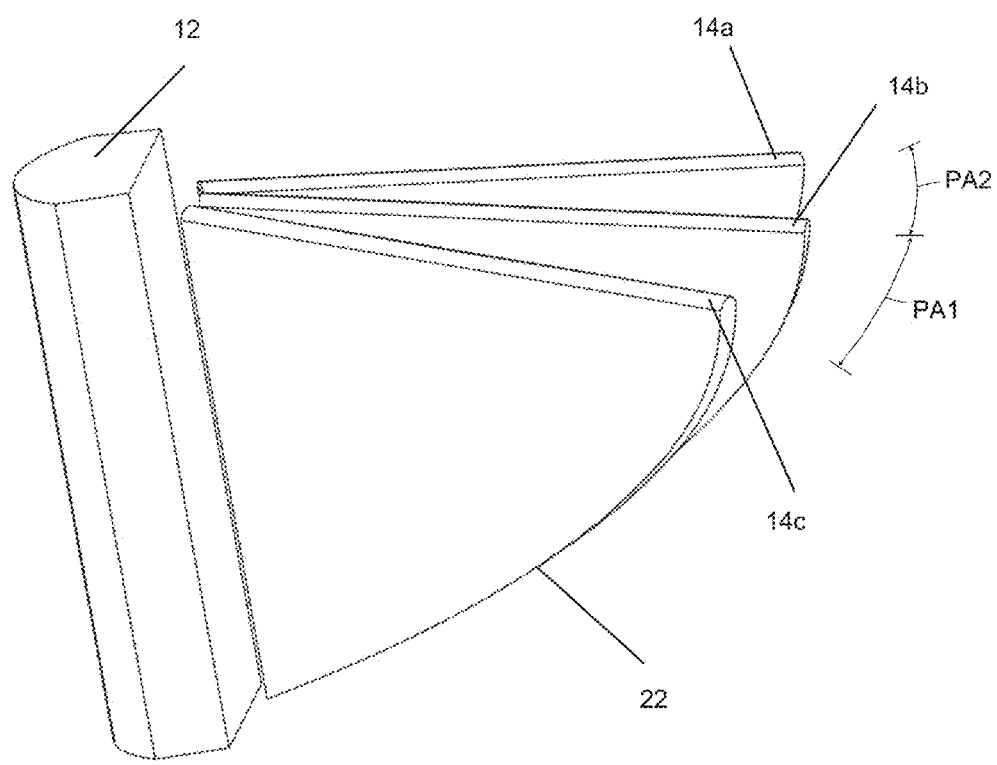

FIGS. 6G, 6H and 6I illustrate various embodiments of the invention in which multiple light guides 14a-14e are present. It should be understood that more or fewer light guides 14a-14e could be provided, such as the embodiment of FIG. 6G-6I. Also, multiple LEDs could be used with each light guide 14a-14e. Also, a device could be provided with the light guide 14a in combination with only one of either light guide 14b or 14c or other light guides, as illustrated in FIG. 32 and described later herein.

In the embodiment being described, note that the plurality of light guides, such as light guides 14a-14-c in FIGS. 1A and 2A and light guides 14a-14e in FIGS. 6G-6I are arranged in a generally equally spaced angular arrangement along an arc a predetermined angle PA apart. In the illustration, the predetermined angle is about 30 degrees. It should be understood, however, that they could be unequally spaced apart, such that, for example, the angle PA1 between light guide 14a and light guide 14c is larger than the angle PA2 between light guide 14a and light guide 14b, as illustrated in FIG. 6H. The particular spacing may, therefore be varied and at least partly driven by the function to be performed and the environment where the light guides 14a-14e will be situated.

Additional Considerations

1. FIG. 7 is a view of the light guide 14a viewed in the direction of arrow A in FIG. 1A. FIG. 7 illustrates the LED 16. In one form of the invention, the LED 16 should be located generally central or midway between wall 14a2 and 14a3 to the light guide 14a as opposed to being displaced to the left or right in FIG. 7, as will now be explained.

FIG. 7 illustrates Snell's Law of refraction. The angle A2 of the transmitted ray follows the sine-function given in the Figure. However, as indicated in FIG. 8, when the incident angle A1 reaches a Critical Angle, the transmitted ray does not exit the light guide 14a, but instead travels parallel to the surface of the light guide 14a as indicated. Total internal reflection occurs when the incident angle A1 exceeds the Critical Angle as illustrated in FIG. 9.

Figure 10:
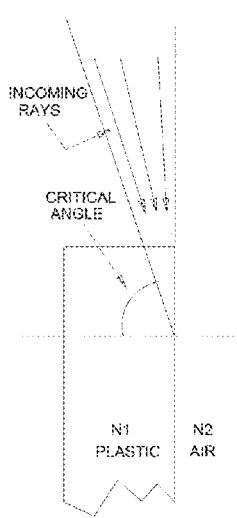
Figure 11:
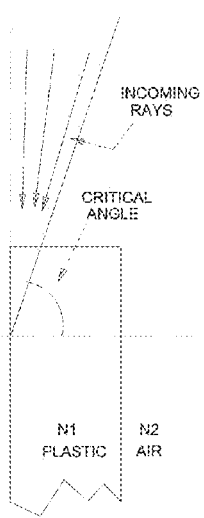
Figure 12:
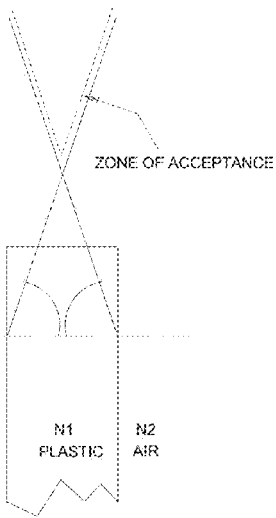

These facts allow one to deduce a Zone of Acceptance (FIGS. 10-12). In FIGS. 10 and 11, in order for total internal reflectance to occur, the incoming rays must exceed the Critical Angle. These two Critical Angles are combined into FIG. 12 which shows the Zone of Acceptance. The angles of the incoming light rays, respectively, should lie within this zone for total internal reflectance to occur.

It is pointed out that a light ray having less than the Critical Angle will also be reflected internally. However, such a ray will experience both transmission and reflection at each encounter with the surface, as best shown in FIG. 10. In this case, if one assumes a reflection coefficient of 0.8, for example, then after ten reflections, the remaining intensity in the ray will be the initial intensity multiplied by 0.8 raised-to-the-tenth-power, which is considered negligible. Such a ray is effectively lost. In contrast, an incident ray at an angle greater than the Critical Angle behaves differently and does not experience this reduction in intensity.

Figure 13:
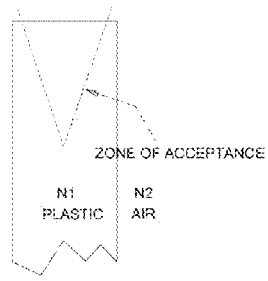
Figure 14:
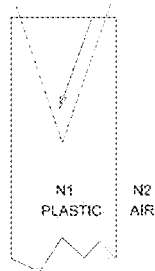
Figure 15:
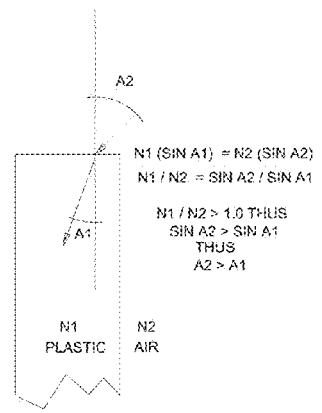
Figure 16:
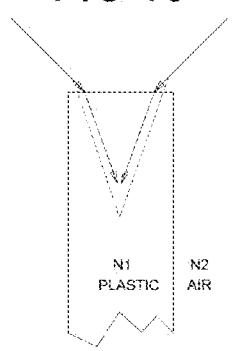

At this point, a small complication arises, namely, that the Zone of Acceptance has been computed based on rays located within the light guide 14a, but the incoming rays outside the light guide 14a will be refracted as they enter the light guide 14a. FIG. 13 shows the Zone of Acceptance lowered into the light guide 14a for ease of explanation. FIG. 14 shows a ray within the light guide 14a at the Critical Angle. FIG. 15 shows how an incoming ray is refracted according to Snell's Law to produce the ray of FIG. 14. The equations point out that the refraction at the surface causes the Zone of Acceptance to open up somewhat outside the light guide 14a because the index of refraction of air is less than that of the light guide 14a. Therefore, the actual Zone of Acceptance is adjusted for the incoming refraction of FIG. 15 and is represented generally by FIG. 16.

Now, the positioning of the LED 16 can be considered. This analysis applies to all the light guides 14a, 14b and 14c, but is only described relative to light guide 14a for ease of illustration. FIG. 17 shows the LED 16 positioned on the central axis AX relative to the entry surface 14a1 of light guide 14a. FIG. 18 shows that LED 16, but with the Zone of Acceptance boundary ZA superimposed. In FIG. 18, as the boundary ZA indicates, the solid rays SR from LED 16 will lie within the Zone of Acceptance and some phantom rays PR (represented by dashed lines in the figure) will not. The phantom rays PR will be lost because they experience the repeated losses of reflection/transmission described above or they simply are directed away from the entry surface 14a1 of the light guide 14a.

However, if the LED 16 is shifted away from the central axis AX, as illustrated in FIG. 19, then all phantom rays PR are still lost because they lack the proper angles. Nothing has changed in this respect. In addition, solid ray R1 is also lost because it fails to enter the light guide 14a entirely.

Therefore, for maximum optical coupling, the LED 16 should lie on the central axis AX of the light guide 14a to avoid loss of rays such as R1.

2. It is possible that future vehicles may be required to significantly reduce power expenditure in their lighting systems and some ways to achieve that reduction will now be considered.

A gasoline or diesel powered engine of a modern passenger automobile has a power rating in the dozens of kilowatts or a few hundred kilowatts, one kilowatt being about 1.25 horsepower. However, the power consumed by the lighting system of such a vehicle lies in the dozens or hundreds of watts. Thus, the power produced by the engine is roughly one thousand times larger than the power consumed by the lighting system.

However, electric vehicles are becoming more abundant. Their electric motors generally also have power ratings in the dozens of kilowatts, similar to current gasoline engines. However, under current technology, the electric batteries used to power the electric motors do not possess comparable energy density to that of liquid fuels. Electric power is at a premium in such vehicle.

Therefore, as the usage of electric vehicles becomes more widespread, it may become important to economize on electric power consumption. In this context, consideration will be given to maximizing the optical coupling between the LED 16 and the light guide 14a to reduce losses and to thereby allow usage of less powerful LEDs 16. The positioning of FIG. 18 represents one improvement in optical coupling.

FIG. 20 is a rough graphical rendition of the Fresnel Equations, which indicate the theoretical reflection coefficients for specular reflection for various angles of incidence. FIG. 20 indicates that the reflection coefficient is minimal and thus the transmission coefficient is maximal at an angle of incidence of zero as measured with respect to the surface normal.

Therefore, to minimize reflection at the interface IF where the light enters the light guide 14a, the light rays should enter perpendicular (as illustrated in FIG. 20) to the surface 14a1. If the LED 16 produces parallel rays, then this is easily accomplished using a flat entry face 14a1. However, if the LED 16 acts as a point source and produces radially directed rays, then the entry face F may be curved so that the rays enter generally perpendicular to the entry face F. In one embodiment, the entry face 14a1 in one or more of the light guides 14a-14c is hemispherical. This is illustrated in FIG. 21.

3. Reflective losses occur where the light from an LED 16, 18 or 20 exits the LED 16, 18 or 20 and enters the air, for example, at area A1 in FIG. 23 and then where light exits the air and enters the light guide surface at area A2. These losses can be reduced by an impedance-matching material M shown in FIG. 23. The required index of refraction of the matching material M is calculated in a known manner.

4. In one form of the invention, the LEDs 16, 18 and 20 are contained on a single, common printed circuit board (PCB) 34 as illustrated in FIGS. 23 and 24. The spacing between adjacent pairs of the LEDs 16, 18 and 20 is equal to a distance between the central axes of the corresponding light guides 14a-14c. In FIG. 23, the LEDs 16, 18 and 20 are located as shown and mounted on the PCB 34. The distance D1 equals the distance D2 and the distance D3 equals the distance D4. A similar principle applies to the multiple light guides 14a-14c in other Figures. Thus, the LED to LED distance of an adjacent pair of LEDs 16, 18 and 20 is the same as the light guide to light guide distance of the corresponding light guides 14a-14c.

5. FIG. 24 is a cross section of one conception of another embodiment of the invention. Light guides 14a-14c, being cantilevered from the lens 12, can experience vibration as indicated by the dashed lines. This vibration can be reduced by fastening adjacent light guides 14a-14c together by using bars 44 near the ends of the light guides 14a-14c. This connection serves to stiffen the vibrating elements. It also increases the mass of the vibrating elements and thus changes the resonant frequency. Alternately, the light guides 14a-14c can be fastened to the vehicle structure by brackets or cassettes, one of which is shown schematically by block 46.

Figure 25:
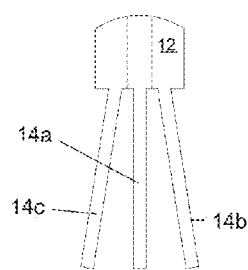
Figure 26:
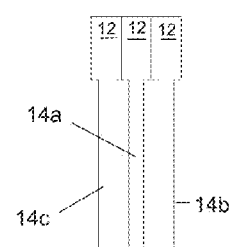
Figure 27:
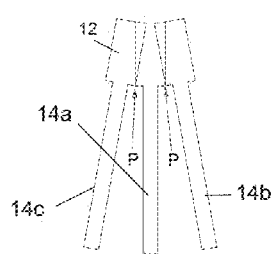

6. FIG. 25 indicates the structure of FIG. 25 being cut or molded into three pieces by the dashed lines. FIG. 26 indicates that the three pieces are rendered identical in shape. FIG. 27 conceptually rotates or pivots the three pieces of FIG. 26 about points P in FIG. 27.

Figure 28:
Figure 29:
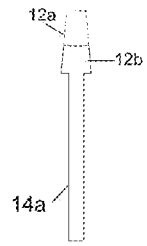

FIG. 28 indicates a shape which can be deduced from FIG. 27. FIG. 29 indicates lens 12 being cut off from the shape of FIG. 28. FIG. 31 indicates three identical shapes of FIG. 29 assembled into a structure with a lens 12' or a portion of lens 12' added.

Figure 30:
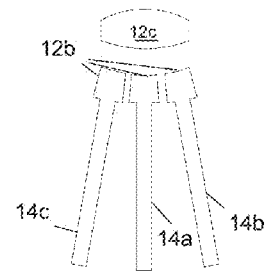

The apparatus of FIG. 30 provides the benefit of utilizing three copies of a single molded component, namely that of FIG. 29, to form one embodiment of the invention. The single molded component is simpler to fabricate compared with the structure of FIGS. 1A-1C.

In another embodiment, the assembly 10 in FIG. 31 can be split, molded or cut along dashed line DL to produce two mirror-image halves on the right side of the Figure. Fabricating a mold for such a half is simpler than fabricating a mold for the entire assembly 10 and the molding process for such a half is simpler as well.

7. Some characteristics of various embodiments of the invention will be discussed. FIG. 10 is a schematic exploded view of one form of the invention. The light guide 14a can be said to have an exit face 14a4 which transmits light into the entry surface 12a of projection lens 12. The exit face 14a4 is thin and broad because the thickness TH is less than the height H. It should be understood that various ratios of height H to thickness TH are possible and ratios of height H to thickness TH may be 5 and 50 or any of the values therebetween (e.g., 5 to 50).

The light guide 14a generates a sheet or beam of light rays LR1 in the example, indicated by arrow 36. The projection lens 12 receives the sheet or beam and expands it transversely, producing a beam indicated by the dashed arrows 38. The various patterns were described earlier herein relative to FIGS. 6A-6F.

8. FIG. 32 illustrates one form of and embodiment of the invention. A vehicle 40 contains two assemblies 10 which are mirror-images of each other. Light guide 14a and LED 16 in both assemblies 10 together generate the low headlight beam for the vehicle 40. Light guide 14c of the right-hand assembly 10 in FIG. 32 generates a right turn signal or a right turn headlight, fog light, daytime running light (DRL)

or bending light, which illuminates the right front of the vehicle during a right turn. Light guide 14*b* generates a left turn signal, fog light, DRL or bending light or a left turn headlight beam.

9. In one form of the invention, the lens 12 is symmetrical about an internal axis or plane. This plane or axis can coincide with the central plane of light guide 14*a*. The lens surface 12*b* is conical or curved and may have the scallops 12*c* as mentioned earlier herein.

10. The light guides 14*a*-14*c* are illustrated as being flat. However, it should be understood that they can be curved and still function properly.

11. It should also be appreciated that the light guides 14*a*-14*c* do not have to be the same size, one or more of them can be different sizes.

12. It should also be understood that different colored LEDs 14*a*-14*c* could be used. Also, each light guide may have a plurality of different color LED, such as white, amber, yellow, or other color to facilitate performing different lighting functions, such as the forward lighting function or turn lighting functions mentioned earlier.

13. Advantageously, the present invention has the following advantages:
   reducing packaging size by placing multiple functions in one optical system and using the same exit optic for all functions;
   consistent lit appearance between different functions;
   smooth transition between functions on the road (no visible streaks where low beam meets bending light);
   all entrance guide may have LEDs that are placed on a single PCB to simplify electronics;
   use of separate optical systems for separate functions; and does not include functions, such as bending or cornering, that are not required to be included.

14. The light guides can be designed to form a plurality of light patterns, such as cut-off, signal, and the like.

This invention, including all embodiments shown and described herein, could be used alone or together and/or in combination with one or more of the features covered by one or more of the claims set forth herein, including but not limited to one or more of the features or steps mentioned in the bullet list in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for a vehicle, comprising:
   a first light guide that projects first light rays from a first light source in a first direction;
   at least one second light guide angularly spaced from said first light guide that projects second light rays from a second light source in a second direction;
   an elongated projection lens which:
      receives said first light rays and emits them to perform a first light function; and
      receives said second light rays and emits them to perform a second light function;
   wherein said first light guide and said at least one second light guide are generally planar or sheet like;
   wherein said first light guide comprises a first exit edge and a first generally parabolic reflective edge having a first focus that generally coincides with said first light source and said at least one second light guide comprises a second exit edge and a second generally parabolic reflective edge having a second focus that generally coincide with said second light source;
   wherein said first and second reflective edges of said first light guide and said at least one second light guide receive light from said first light source and said second light source, respectively, and said first light guide emits a first beam through said first exit edge to said elongated projection lens and said at least one second light guide emits a second beam through said second exit edge to said elongated projection lens.

2. The lighting device according to claim 1, in which said projection lens, said first light guide, and said at least one second light guide are an integral, monolithic construction of transparent material.

3. The lighting device according to claim 1, in which said first light guide and said at least one second light guide are angularly spaced from each other by a predetermined angle.

4. The lighting device according to claim 1, in which all adjacent ones of said first light guide and said at least one second light guide comprises at least two second light guides that are angularly spaced along an arc an equal distance apart.

5. The lighting device according to claim 1, in which all adjacent ones of said first light guide and said at least one second light guide comprises at least two second light guides that are angularly spaced along an arc different distances apart.

6. The lighting device according to claim 1, in which said first light guide and said at least one second light guide are parabolic and generally planar light guides.

7. The lighting device according to claim 1, in which the first light function is a forward lighting function defining at least one of a low beam headlight or a part of a low beam headlight, a high beam headlight or a fog light for the vehicle.

8. The lighting device according to claim 1, in which the second light function is a side lighting function defining at least one of a turn signal light or a side light low beam headlight, a high beam headlight or a fog light for the vehicle.

9. The lighting device according to claim 1, in which said first light guide contains a central plane which bisects the projection lens.

10. The lighting device according to claim 1, in which said first light guide and said at least one second light guide each comprise an exit face that is spaced from an entry face of said elongated projection lens.

11. The lighting device according to claim 1, in which said first light source comprises at least one first LED and said second light source comprises at least one second LED,
   wherein when said at least one first LED is activated, said first lighting function is performed and when said at least one second LED is activated said second lighting function is performed.

12. The lighting device according to claim 7, in which the second light function is a side lighting function defining at least one of a turn signal light, bending light or a side light for the vehicle.

13. The lighting device according to claim 11, in which said at least one first LED and said at least one second LED are activated substantially simultaneously to perform said first and second lighting functions substantially simultaneously.

14. An optical device for a vehicle, comprising:
a first light guide which receives light from a first light source and forms the light into a first beam that performs a first lighting function forward of the vehicle;
at least one second light guide angularly spaced from said first light guide which receives light from a second light source and forms the light into a second beam that performs a second lighting function;
a lens which
i) receives the first beam and transmits the first beam in a first direction forward of the vehicle; and
ii) receives the second beam and transmits the second beam in a second direction at an angle that is not parallel to a longitudinal axis of the vehicle;
wherein said first light guide and said at least one second light guide are generally planar or sheet like;
wherein said first light guide comprises a first exit edge and a first generally parabolic reflective edge having a first focus that generally coincides with said first light source and said at least one second light guide comprises a second exit edge and a second generally parabolic reflective edge having a second focus that generally coincides with said second light source;
wherein the first and second reflective edges of said first light guide and said at least one second light guide receive light from the first light source and second light sources, respectively, and said first light guide emits said first beam through the first exit edge to the lens and said at least one second light guide emits said second beam through the second exit edge to the lens.

15. The optical device according to claim 14 in which the at least one of said first light guide or said at least one second light guide comprises:
a reflective edge which is of generally parabolic shape and positioned so that its focus generally coincides with said first light source;
wherein the reflective edge receives light from the first light source, forms it into said first beam, and projects the first beam to a projection lens.

16. The optical device according to claim 14 wherein said first exit edge and said second exit edge are both spaced from said lens.

17. The optical device according to claim 14, in which said lens, said first light guide, and said at least one second light guide are an integral, monolithic construction of transparent material.

18. The optical device according to claim 14, in which the first and second light guides are cantilevered from the lens and further comprise: a connector which connects the cantilevered light guides together, to thereby stiffen them.

19. The optical device according to claim 14, in which the first beam is wider than the second beam and is effective to form a headlight for a vehicle.

20. The optical device according to claim 14, in which said first light guide and said at least one second light guide are angularly spaced from each other by a predetermined angle.

21. The optical device according to claim 14, in which all adjacent ones of said first light guide and said at least one second light guide comprises at least two second light guides that are angularly spaced along an arc an equal distance apart.

22. The optical device according to claim 14, in which at least one adjacent ones of said first light guide and said at least one second light guide comprises at least two second light guides that are angularly spaced along an arc different distances apart.

23. The optical device according to claim 14, in which the first light function is a forward lighting function defining at least one of a low beam headlight, a high beam headlight or a fog light for the vehicle.

24. The optical device according to claim 14, in which the second light function is a side lighting function defining at least one of a turn signal light or a side light low beam headlight, a high beam headlight or a fog light for the vehicle.

25. The optical device according to claim 14, in which said first light source comprises at least one first LED and said second light source comprises at least one second LED;
wherein when said at least one first LED is activated, said first lighting function is performed and when said at least one second LED is activated said second lighting function is performed, said at least one first LED and said at least one second LED being activated substantially simultaneously.

26. The optical device as recited in claim 14, wherein said at least one second light guide comprises a second light guide situated adjacent said first light guide and a third light guide situated adjacent said first light guide, said second and third light guides being adapted to perform said second lighting function, while said first light guide performs said first lighting function, said first lighting function being a forward headlight function.

27. The optical device according to claim 16, in which the first beam crosses the second beam inside the lens.

28. The optical device according to claim 25, in which said at least one first LED and said at least one second LED are activated substantially simultaneously to perform said first and second lighting functions substantially simultaneously.

29. A lighting system for a vehicle, comprising:
a) a first solid, transparent body, which comprises:
i) a first lens;
ii) a first light guide, which transmits a first beam of light to the first lens, which the first lens projects forward of the vehicle; and
iii) a second light guide angularly spaced from said first light guide, which transmits a second beam of light to the first lens, which the first lens projects to the left front side of the vehicle;
wherein said first light guide and said second light guide are generally planar or sheet like;
wherein said first light guide comprises a first exit edge and a first generally parabolic reflective edge having a first focus that generally coincides with a first light source and said second light guide comprises a second exit edge and a second generally parabolic reflective edge having a second focus that generally coincides with a second light source;
wherein said first and second reflective edges of said first light guide and said second light guide receive light from said first light source and said second light source, respectively, and said first light guide emits a first beam through said first exit edge to said first lens and said second light guide emits a second beam through said second exit edge to said first lens; wherein the first lens is an elongated projection lens;
b) a second solid, transparent body, which comprises:
i) a second lens;

ii) a third light guide, which transmits a third beam of light to the second lens, which the second lens projects forward of the vehicle; and iii) a fourth light guide, which transmits a fourth beam of light to the second lens, which the second lens projects to the right front side of the vehicle;

wherein said third light guide and said fourth light guide are generally planar or sheet like;

wherein said third light guide comprises a third exit edge and a third generally parabolic reflective edge having a third focus that generally coincides with a third light source and said fourth light guide comprises a fourth exit edge and a fourth generally parabolic reflective edge having a fourth focus that generally coincides with a fourth light source;

wherein said third and fourth reflective edges of said third light guide and said fourth light guide receive light from said third light source and said fourth light source, respectively, and said third light guide emits a third beam through said third exit edge to said second lens and said fourth light guide emits a fourth beam through said fourth exit edge to said second lens; and wherein the second lens is an elongated projection lens.

30. The lighting system according to claim 29, in which the first and second bodies are mirror images of each other.

31. The lighting system according to claim 29, and further comprising a light source for each respective light guide.

32. The lighting system according to claim 29, and further comprising a plurality of light sources for at least one of said light guides.

33. The lighting system according to claim 29, and further comprising a plurality of light sources for each light guide.

34. The lighting system according to claim 31, in which each light guide comprises a curved edge (1) to which the respective light source transmits light, and (2) which reflects the light as a beam of parallel rays.

\* \* \* \* \*